April 11, 1967 W. R. SWENSON 3,313,422
COLLECTOR APPARATUS
Filed Oct. 23, 1963 3 Sheets-Sheet 1
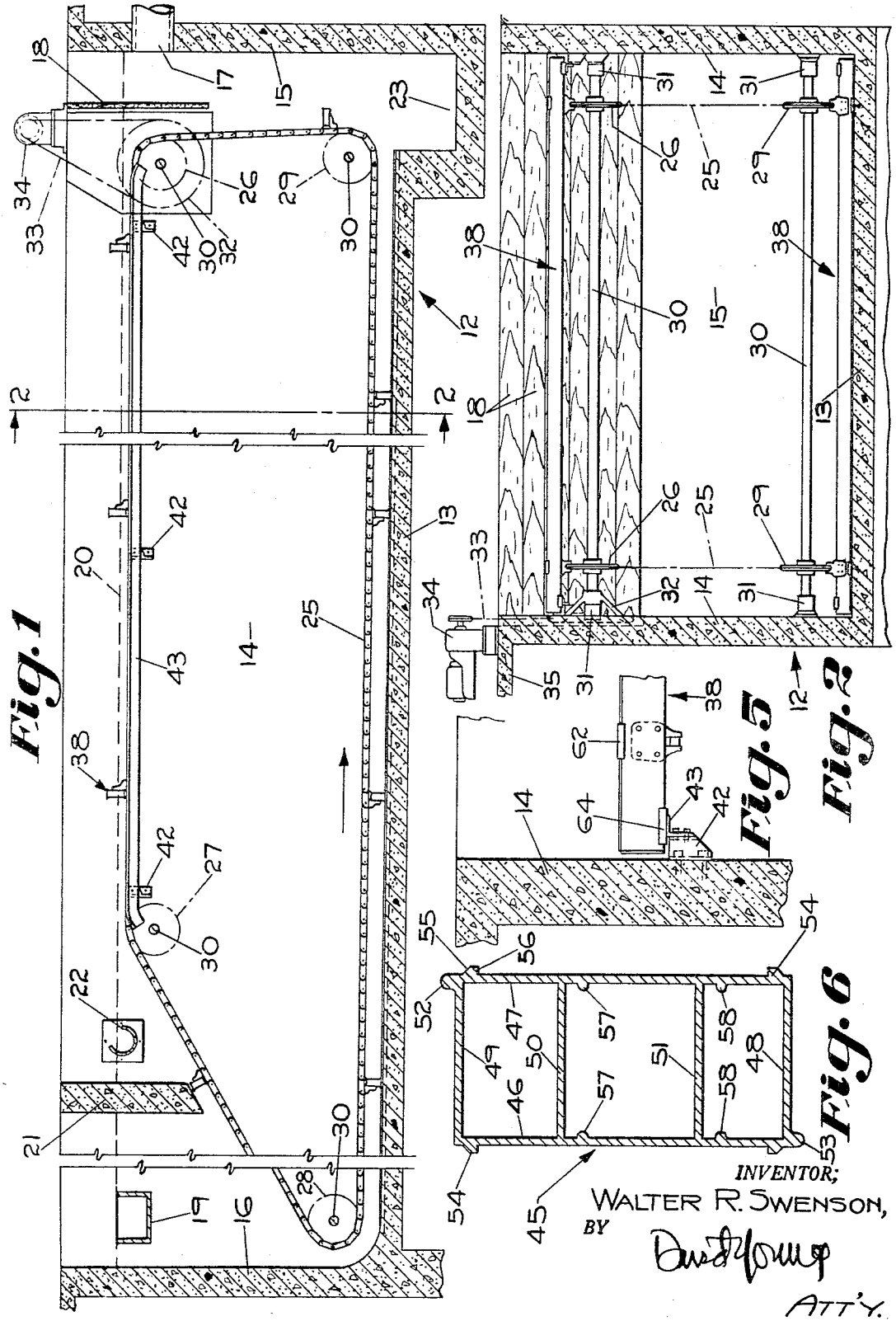
INVENTOR:
WALTER R. SWENSON,
BY
ATT'Y.

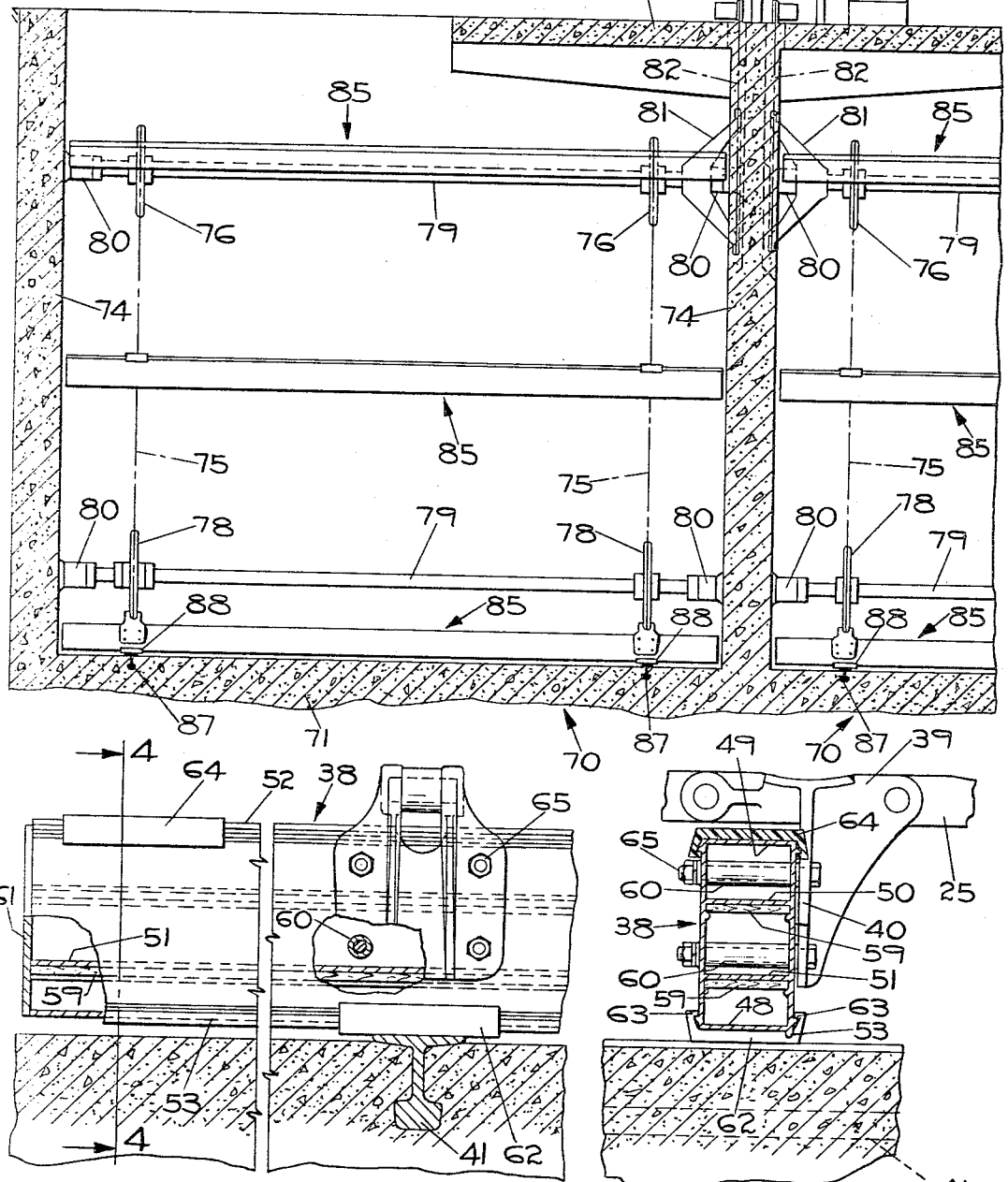

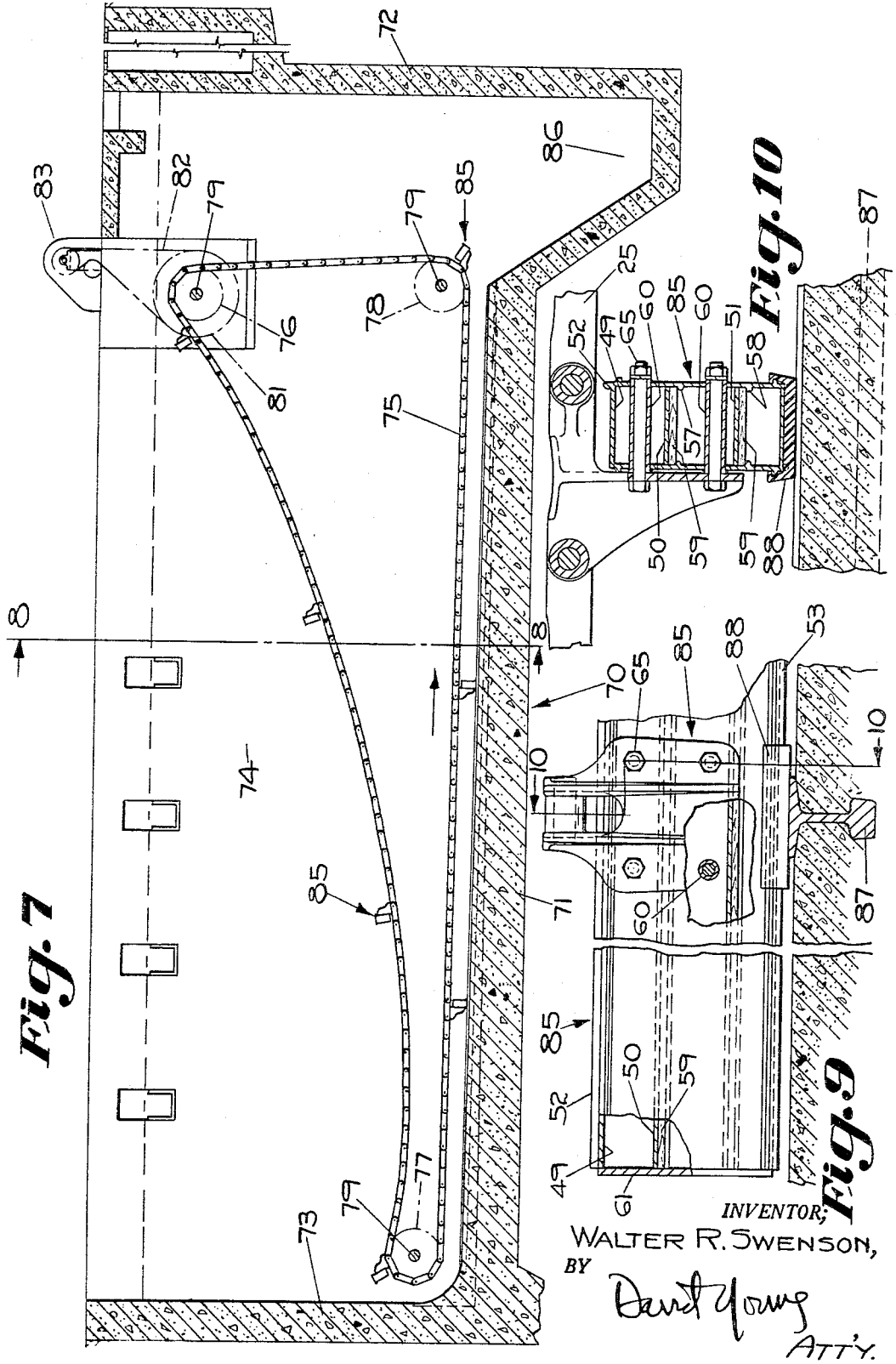

United States Patent Office 3,313,422
Patented Apr. 11, 1967

3,313,422
COLLECTOR APPARATUS
Walter R. Swenson, Columbus, Ohio, assignor to Jeffrey Galion Manufacturing Company, a corporation of Ohio
Filed Oct. 23, 1963, Ser. No. 318,308
2 Claims. (Cl. 210—523)

The instant invention relates to collector apparatus such as is used in sewage treatment and water treatment plants to remove sludge and floatable wastes. More particularly, the invention relates to an improved flight and carrier construction for such collector apparatus.

It is an object of the instant invention to provide an improved flight and carrier construction for collector apparatus in which the forces required to move the same are materially reduced, to improve the operation and performance of the same and to reduce the wear of the parts of such apparatus, whereby the operating life of the apparatus is materially increased.

It is a further object of the instant invention to provide an improved collector apparatus in which the flights are buoyant to support at least part of the loads in such apparatus.

It is still another object of the instant invention to provide an improved collector apparatus in which the flights are buoyant, and the buoyant force of the fluid on the flights is in excess of the weight of the flight, whereby such buoyant force may support the flight carrier, at least in part, to reduce the operating loads in the apparatus.

A further object of this invention is to provide an improved flight construction in which such flight is hollow, so as to be buoyant.

It is also an object of this invention to provide an improved flight construction for a collector apparatus in which the flight is formed of an inert plastic material, and includes an extrusion of such material as the major element of the flight.

Still another object of the instant invention is to provide an improved flight construction for a collector apparatus in which the flight has wear shoes that are releasably secured to the flight.

Other objects of the invention will appear hereinafter, the novel features and combinations being set forth in the appended claims.

In the drawings:

FIG. 1 is a longitudinal sectional view of a primary settling tank embodying the invention;

FIG. 2 is a transverse sectional view of the primary tank, taken on the line 2—2 in FIG. 1;

FIG. 3 is an enlarged view of a portion of the flight on the bottom of the primary tank;

FIG. 4 is a transverse sectional view of the flight on the bottom of the tank, taken on the line 4—4 in FIG. 3;

FIG. 5 is an enlarged view of a portion of the flight skimming the surface of the fluid in the primary tank;

FIG. 6 is a sectional view of the plastic extrusion for the flight;

FIG. 7 is a longitudinal sectional view of a secondary settling tank embodying the invention;

FIG. 8 is a transverse sectional view of the secondary settling tank, taken on the line 8—8 in FIG. 7;

FIG. 9 is an enlarged view of a portion of the flight on the bottom of the secondary tank; and FIG. 10 is a transverse sectional view of the flight on the bottom of the tank, taken on the line 10—10 in FIG. 9.

There is illustrated in FIGS. 1 and 2 a primary settling tank 12, which is most usually formed of reinforced concrete. The primary tank 12 includes a bottom 13, opposite side walls 14, 14, an influent end wall 15 and an effluent end wall 16, which together define the tank 12. A conduit 17 extends through the influent end wall 15 and delivers the fluid, including the waste materials, into the settling tank 12. A baffle 18 extends across the top of the settling tank 12, between the side walls 14, 14, and extends downwardly in front of the conduit 17 and somewhat below the latter, so that the influent flow of fluid is distributed across the settling tank 12 and enters the same in a gentle stream, and does not cause any turbulence. The fluid flows steadily through the settling tank 12 from the influent end wall 15 to the effluent end wall 16. One or more box weirs 19 near the effluent end wall 16 provide transverse channels for flow of the fluid out of the primary settling tank 12.

The fluid which flows into the primary settling tank 12 is usually water, and will contain settleable solid wastes which are termed sludge, and floatable wastes or scums, including floatable solids, oils and greases. As the fluid slowly flows through the settling tank 12, the settleable solids or sludge descend to the bottom 13, and the floatable wastes or scum rise to the surface of the fluid.

Collector apparatus is provided in the settling tank 12 for collecting the wastes, incident to removal of the same. Such collector apparatus includes a plurality of transverse flights 38, which are moved along the bottom 13 to scrape the sludge from the bottom, whereby it is collected for removal from the tank 12. Such flights 38 are also moved along the surface of the fluid in the tank 12, to skim the surface and thereby collect the floatable wastes for removal of the same from the tank 12. The flow of the fluid through the tank 12 is relatively slow, to avoid turbulence, such as might cause the wastes to remain suspended in the fluid, rather than settling to the bottom 13 and rising to the fluid surface 20. The rate of flow of the fluid through the tank 12 is carefully maintained at such slow speed that the fluid surface 20 remains fixed.

A baffle 21 extends across the tank 12 at a position upstream of the effluent end wall 16, and prevents the floatable wastes from flowing further downstream. Upstream of the baffle 21, and in front of the same, there is provided a collecting trough 22 for the floatable wastes, and as the latter are skimmed from the fluid surface 20, they are received in the collecting trough 22 to be discharged from the settling tank 12. At the influent end wall 16 there is provided a sludge trough 23, in which the sludge is deposited as it is collected from the tank bottom 13. The sludge is constantly discharged from the sludge trough 23, so that there is a continuous removal of the same.

The collector apparatus in the primary settling tank 12 includes a pair of endless chains 25, 25, which are disposed one at each side of the settling tank 12, near the side walls 14, 14. Customarily, endless chains are utilized as the carriers for the flights 38 in the collector apparatus, although other endless flexible driving elements may be utilized. The endless carrier chains 25 are parallel to each other and extend longitudinally of the settling tank 12. The endless carrier chains 25 are trained around pairs of sprockets 26, 27, 28, 29, and are engaged with the teeth thereof. Each pair of sprockets 26, 27, 28, 29 is mounted on a transversely extending shaft 30, the ends of which are rotatably supported in bearings 31, 31. The bearings 31, 31 for each shaft 30 are secured in a suitable manner to the tank side walls 14, 14. The shaft 30 for the pair of sprocket wheels 26, 26 has a driving sprocket 32 secured thereto, which is engaged by a driving chain 33 extending downwardly from a power drive unit 34, the latter being mounted on a suitable platform 35. A chain and sprocket drive, as illustrated, is preferred, although it will be understood that other drives may be employed. Thus, the pair of sprockets 26 drive the endless carrier chains 25, 25. The other pairs of sprockets 27, 28, 29 engage the endless carrier chains 25, 25, to guide the same in their movement through the tank 12, and define the path through which the chains 25, 25 move.

A plurality of transversely extending flights 38 are secured to the endless carrier chains 25, 25 at successive positions along the chains 25, 25, and spaced from each other therealong. As best seen in FIGS. 3 and 4, the endless carrier chains 25, 25 are each provided with special attachment links 39, each of which includes a bracket portion 40, by which the flight 38 is secured to the carrier chains 25, 25.

In the bottom 13 of the settling tank 12 there are embedded a pair of rails 41, 41, one of which is illustrated in detail in FIGS. 3 and 4. The rails 41, 41 extend longitudinally of the settling tank 12 and are disposed slightly above the bottom 13 to provide tracks on which the flights 38 ride as they scrape the bottom 13, moving from the effluent end wall 16 towards the influent end wall 15 to collect the sludge from the bottom 13.

A plurality of brackets 42 are secured to each side wall 14, 14 below the tops of the same and at longitudinally spaced positions along the side walls 14, 14. A rail 43 is secured to the brackets 42 on each side wall 14. The rails 43, 43 extend longitudinally along the side walls 14, 14 and provide tracks for the flights 38 as they are moved along the fluid surface 20 to skim the floatable wastes from the latter. The rails 43, 43 are located at such elevation that the transverse flights 38 are partially immersed in the fluid as they ride along the rails 43, 43. It is preferred that the flights 38 be approximately two-thirds immersed in the fluid, although this may vary from one installation to another.

The construction of the flights 38 is illustrated in greater detail in FIGS. 3, 4 and 6. The flights 38 are buoyant in the body of fluid contained within the tank 12. In order to constitute the flights 38 as buoyant bodies they have a hollow, walled construction, whereby the weight of a flight 38 is substantially less than the weight of the volume of fluid displaced by such flight 38. It is preferred that the flight 38 be formed of plastic material that is substantially inert and is impervious to fluid penetration. All manner of substances, such as oils, greases, acids, alkalies, bacteria, marine borers and fungus, come in contact with the flights 38 in the settling tank 12, and the flights 38 must be resistant to these. Accordingly, a highly inert, impervious plastic material is very suitable for construction of the flights 38. Further it is desired that the flights 38 be formed as sealed elements and that no fluid penetrate the same, so that the flights will retain their buoyancy throughout the life of the same, to the same degree as when initially installed. One material that satisfies these requirements, and is suitable for the construction of the flights 38 is a high impact, polyvinyl chloride plastic.

The flight 38 may be formed of an extrusion 45 of the plastic material, having a sectional configuration as shown in FIG. 6. Such extrusion 45 has opposite side walls 46, 47 which are spaced from each other, a bottom wall 48, and a top wall 49, which extend between the side walls 46, 47. The several walls 46, 47, 48, 49 form the perimeter of the hollow, walled extrusion 45. Upper and lower intermediate walls 50, 51 extend between the side walls 46, 47 and further rigidify the extrusion 45.

A rib 52 extends along the upper right corner of the extrusion 45, and a like rib 53 extends along the lower left corner of the extrusion 45, both as viewed in FIG. 6. Ribs 54 extend along the side walls 46, 47, there being two such ribs 54 on each side wall 46, 47, with one being disposed near the top and the other near the bottom of the respective side walls 46, 47. The ribs 54 are oppositely disposed on the side walls 46, 47. Each rib 54 provides a bevel 55 facing towards the lower wall 48 or the upper wall 49, as seen in FIG. 6, and a lateral flange 56 facing away from the lower wall 48 or the upper wall 49, also as seen in FIG. 6. The function of the several parts of the extrusion 45 will be described hereinafter.

It is intended that the several walls of the extrusion 45 be sufficiently thick to have such strength that a flight 38 constructed of the same will be self-supporting. However, it may be that in a flight 38 of exceptional length the extrusion 45 would bend or sag, and therefore, would require some stiffening means to maintain the flight 38 in a straight condition. For this purpose, the extrusion 45 is provided with a first pair of ribs 57, 57 and a second pair of ribs 58, 58, which extend inwardly from the opposite side walls 46, 47. The ribs 57, 57 are disposed below, and spaced from the upper intermediate wall 50, and similarly, the pair of ribs 58, 58 are disposed below and spaced from the lower intermediate wall 51. A reinforcing member of rigid material may be added to the flight 38, adjacent the upper intermediate wall 50, and likewise adjacent the lower intermediate wall 51, for example as seen in FIGS. 3 and 4. Such reinforcing members 59 are disposed against the intermediate walls 50, 51, and under the latter, with the respective pairs of ribs 57, 58 holding the reinforcing members 59 in place.

In constructing a flight 38, the extrusion 45 is cut to the proper length, this being determined by the width of the settling tank 12. Then, the extrusion 45 is drilled at two locations, or otherwise formed with four apertures extending through each of the side walls 46, 47, in alignment with the four holes provided in the bracket portion 40 of each special attachment link 39. A tube 60 is inserted through each pair of holes, from the side wall 46 to the side wall 47, with the tube projecting beyond each side wall 46, 47. In the preferred embodiment of the invention, in which the extrusion 45 is formed of plastic material, the tubes 60 are formed of like plastic material and are secured to the extrusion 45 by heat welding. The opposite ends of the extrusion 45 are each closed by a plate end cap 61, which is a simple rectangular piece of plastic material, of such size as to close an end of the extrusion 45. The plate end cap 61 is secured to the extrusion 45 by heat welding. Such joinder of the elements by heat welding forms a seal to prevent fluid from getting inside the flight 38 through the joints, thereby maintaining the buoyancy of the flight 38.

The flights 38 are moved by the carrier chains 25, 25 over the tank bottom 13, which has the rails 41, 41 embedded therein to provide tracks for the flight 38. Wear shoes 62, 62 are releasably secured to each flight 38 to bear on the tracks 41, 41. Each shoe 62 is preferably formed of the same plastic material as the remainder of the flight 38, by reason of its inert characteristics, and further, by reason of the low coefficient of friction of such plastic material, which facilitates movement of the flight 38 over the tracks 41, 41. However, it will be understood that other materials may be utilized. Each wear shoe 62 is formed with opposite, inwardly directed lips 63, 63 formed one at the front end at the rear of the wear shoe 62. A wear shoe 62 is attached to the flight 38 by snapping it onto the flight 38 against the bottom wall 48. The bevels 55, 55 on the ribs 54, 54 cause the lips 63, 63 to spread outwardly, and when the main body portion of the wear shoe 62 is brought into bearing engagement with the bottom wall 48, the ribs 63, 63 snap back inwardly behind the flanges 56, 56, whereby the shoe 62 is secured on the flight 38. If necessary, the shoe 62 may be removed from the flight 38 by prying it off the same. The ribs 53 must be cut away or notched at the position on the flight 38 at which it is desired to attach the wear shoe 62. However, the portions of the rib 53 which remain, abut the opposite ends of the wear shoe 62 and thereby prevent it from moving in a longitudinal direction on the flight 38.

In FIGS. 3 and 4, the flight 38 is illustrated on the tank bottom 13. When the flight 38 is skimming the liquid surface, it is in the position illustrated in FIG. 5, which is reversed relative to the position illustrated in FIGS. 3 and 4. Wear shoes 64, 64 are provided on the top wall 49 of the flight 38 (see FIG. 4) to support the flight 38 as it moves along the rails 43, 43. In FIGS. 3 and 4, the wear shoes 64, 64 appear to be at the top of the flight 38, and in FIG. 5 the wear shoes 64, 64 appear to be at the bottom of the flight 38, due to the fact that the flight 38 reverses its position in moving from the tank bottom 13 to the fluid surface 20. The rib 52 is notched or cut away, so that the wear shoe 62 may be secured to the flight 38 against the top wall 49. The remaining portions of the rib 52 abut the opposite sides of the wear shoe 64 and maintain it in position by preventing longitudinal movement of the same.

The flight 38, constructed as above described, may be attached to the endless chain carriers 25, 25 by a plurality of bolts 65 extending through the bracket portions 40 of the special attachment links 39 and through the bolt receiving tubes 60. In the event that it becomes necessary to do so, the flights 38 may be easily removed, simply by removing the bolts 65.

The flight 38, constructed in accordance with this invention, is a sealed hollow, walled member that is buoyant in the fluid. The weight of the flight 38 is counteracted or balanced by the buoyant force of the fluid on the flight 38. The weight of the fluid displaced by the flight 38 when it is totally immersed in the fluid, for example, as when the flights 38 are scraping the tank bottom 13, is greater than the weight of the flight 38. Thus, the buoyant force on the flight 38 exceeds the weight of the flight so that, in effect, there is what may be termed an excess buoyant force. The endless chain carriers 25, 25 are made of metal and are non-buoyant in the fluid, and the weight of the endless chain carriers 25, 25 acting downwardly on a given flight 38, is greater than the excess buoyant force on such flight 38. Thus, there is a net force acing downwardly, due to the weight of the chain carriers 25, 25, operating to maintain the flight on the tank bottom 13 in engagement with the tracks 41, 41.

In the upper run of the chain carriers 25, 25, in which the flights 38 skim the fluid surface 20, it is preferred that the flights 38 be approximately two-thirds immersed in the fluid. With the flights 38 immersed to this extent, the weight of the flights 38 is counteracted or balanced by the buoyant force of the fluid on the flights 38. Again, there is an excess buoyant force, over the above the weight of the flights 38, and such excess buoyant force counteracts a part of the weight of the chain carriers 25, 25. However, there is a net force, this being a portion of the weight of the chain carriers 25, 25, which acts downwardly to maintain the flights 38 in engagement with the side rails 43, whereby the flights 38 are maintained in a predetermined position relative to the liquid surface 20.

At the influent end of the tank 12 the chain carriers 25, 25 travel in a substantially upright run, and at the effluent end of the tank 12 the chain carriers 25, 25 move in an inclined run. In each of these runs the weight of the chain carriers 25, 25 is at least in part counteracted or balanced by the buoyant force of the fluid on the flights 38 which is in excess of the weight of the flight. In effect then, the buoyancy of the several flights 38 counteracts or balances, at least in part, what may be termed the dead weight of the flights 38 and endless chain carriers 25, 25. The total effect, then, is that the load of the collector apparatus, comprising the endless chain carriers 25, 25 and the several flights 38, is materially reduced. Accordingly, the power requirements for driving the drive sprockets 26, 26 are materially reduced, and the wear on all the sprockets, shafts, bearings, chain carriers and wear shoes is also reduced, materially increasing the operating life of the apparatus. As a further contributing factor, the wear shoes 62, 64 are formed of plastic material having a relatively low coefficient of friction, thereby additionally decreasing the operating load in the collector apparatus.

The buoyant force acting on a given flight 38 is a function of the length of such flight 38, which in turn depends on the width of the tank 12. Thus, a longer flight 38 will have a greater buoyant force acting on it than a shorter flight 38. However, the net force of the chain carriers 25, 25, acting downwardly, may be maintained constant in tanks 12 of all sizes by varying the spacing of the flights 38 along the chain carriers 25, 25. Also, the buoyant force can be varied by variation of the volume displayed by a flight 38.

FIGS. 7 to 10, inclusive, illustrate the application of the invention to a secondary settling tank 70, in which the collector apparatus collects sludge from the bottom of the tank. In this application the collector apparatus does not perform a skimming operation. The secondary settling tank 70 is most usually formed of reinforced concrete, with a bottom 71, an influent end wall 72, an effluent end wall 73, and opposite side walls 74, 74. The fluid flows slowly from the influent and wall 72 towards the effluent end wall 73. As seen in FIG. 8, there are two secondary settling tanks 70, disposed one beside the other, with a common side wall 74. There may be a number of such tanks 70 arranged side by side, depending on the size and character of the particular installation. The description will proceed with reference to one tank 70 only, it being understood that the description is applicable to each tank.

Within the secondary settling tanks 70 there is provided a collector apparatus comprising a pair of endless carrier chains 75, 75, which are disposed parallel to each other one near each side wall 74. The endless carrier chains are trained over a pair of drive sprockets 76, 76 and over two pairs of guiding sprockets 77, 77 and 78, 78. The drive sprockets 76, 76 are secured to a shaft 79 that extends transversely across the tank 70 and is rotatably mounted in bearings 80, 80, secured to the opposite side walls 74, 74. The sprockets 77, 77 and the sprockets 78, 78 are likewise secured to similar shafts 79 which extend transversely across the tank 70, with their opposite ends rotatably mounted in similar bearings 80, 80 secured to the opposite side walls 74, 74.

A drive sprocket 81 is secured to the shaft 79 for the drive sprockets 76, 76 and is engaged by a drive chain 82 extending downwardly from a suitable power drive unit 83 mounted on a platform 84 at the top of the tank 70.

A plurality of transverse flights 85 are secured to the endless carrier chains 75, 75 at successive positions along the chains 75, 75 and spaced from each other. The flights 85 are constructed in the same manner as the flights 38, previously described, and are attached to the endless carrier chains 75, 75 in the same manner as described above in respect to the flights 38. Accordingly, a description of the flights 85 and the manner of attaching the same to the endless carrier chains 75, 75 is not repeated here, but may be understood by reference to the preceding description.

Since there is no skimming operation of the flights 85 in the secondary settling tank 70, the endless chain carriers 75, 75 extend from the drive sprockets 76, 76 to the guiding sprockets 77, 77 in a downwardly directed catenary. In such run of the endless carrier chains 75, 75, the buoyant force acting on the several flights 85, at least in part, supports the weight of the endless carrier chains 75, 75. However, there is a net force acting downwardly due to the weight of the endless carrier chains 75, 75, which maintains them in engagement with the drive sprockets 76, 76 and the guiding sprockets 77, 77.

In the run of the endless carrier chains 75, 75 along the tank bottom 71, the flights 85 scrape the sludge from the tank bottom 71 into a sludge sump 86, from which the sludge is discharged. A pair of laterally spaced, parallel rails 87, 87 are embedded in the tank bottom 71 and provide tracks for the flights 85 as they move the tank bottom 71. The flights 85 are provided with wear shoes 88 releasably secured thereto, which bear against the rails 87, 87. The wear shoes 88 are similar in all respects to the wear shoes 62, 64 previously described in connection with the flights 38.

In accordance with the instant invention it is contemplate that the buoyancy of the flights of the collector apparatus remain constant throughout the life of the same. This may be achieved by the use of plastic material which is impervious to the fluid, and to the other substances encountered in sewage treatment and water treatment plants. Accordingly, it is possible to design a collector apparatus and to determine the loads involved in driving the same, and such loads will remain substantially the same throughout the operating life of the collector apparatus.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

I claim:

1. An elongated collector flight for scraping or skimming operation in a body of fluid, a wear shoe releasably secured to the flight for engagement with a track on which the flight is supported and guided, said flight having opposite longitudinally extending flanges and said shoe having opposite lips engaged with the flanges to secure the shoes to the flight, and a rib extending along said flight and having a notch formed in the rib to receive the shoe in said notch with portions of the rib abutting opposite ends of the shoe to maintain it in fixed position on the flight.

2. An elongated collector flight for scraping or skimming operation in a body of fluid, a wear shoe releasably secured to the flight for engagement with a track on which the flight is supported and guided, said flight having oppositely disposed ribs extending longitudinally along the flight and each formed with a bevel on one side and a flange on the other side, said shoe having oppositely disposed lips adapted to meet said opposite bevels and flanges, said opposite lips being flexible to be sprung over the bevels for engaging the lips with the flanges to secure the shoe to the flight and the shoe being releasable by prying the lips off the flanges.

References Cited by the Examiner
UNITED STATES PATENTS

| | | | |
|---|---|---|---|
| 1,279,696 | 9/1918 | Holthoff | 85—1.5 |
| 1,551,781 | 9/1925 | Baker | 85—1.5 |
| 1,864,778 | 6/1932 | Tark | 210—524 X |
| 2,067,277 | 1/1937 | Miick | 210—525 |
| 2,160,534 | 5/1939 | Briggs | 210—526 X |
| 2,676,920 | 4/1954 | Janis | 210—524 |
| 2,790,187 | 4/1957 | Marconi | 9—8 |
| 3,094,719 | 6/1963 | Nelson | 9—8 |

FOREIGN PATENTS 514,662    11/1939    Great Britain.

REUBEN FRIEDMAN, *Primary Examiner.*

J. DE CESARE, *Assistant Examiner.*